Nov. 2, 1937.　　　D. A. OLMSTED　　　2,097,840
TRACTOR GUIDE
Filed Dec. 31, 1936　　2 Sheets-Sheet 1
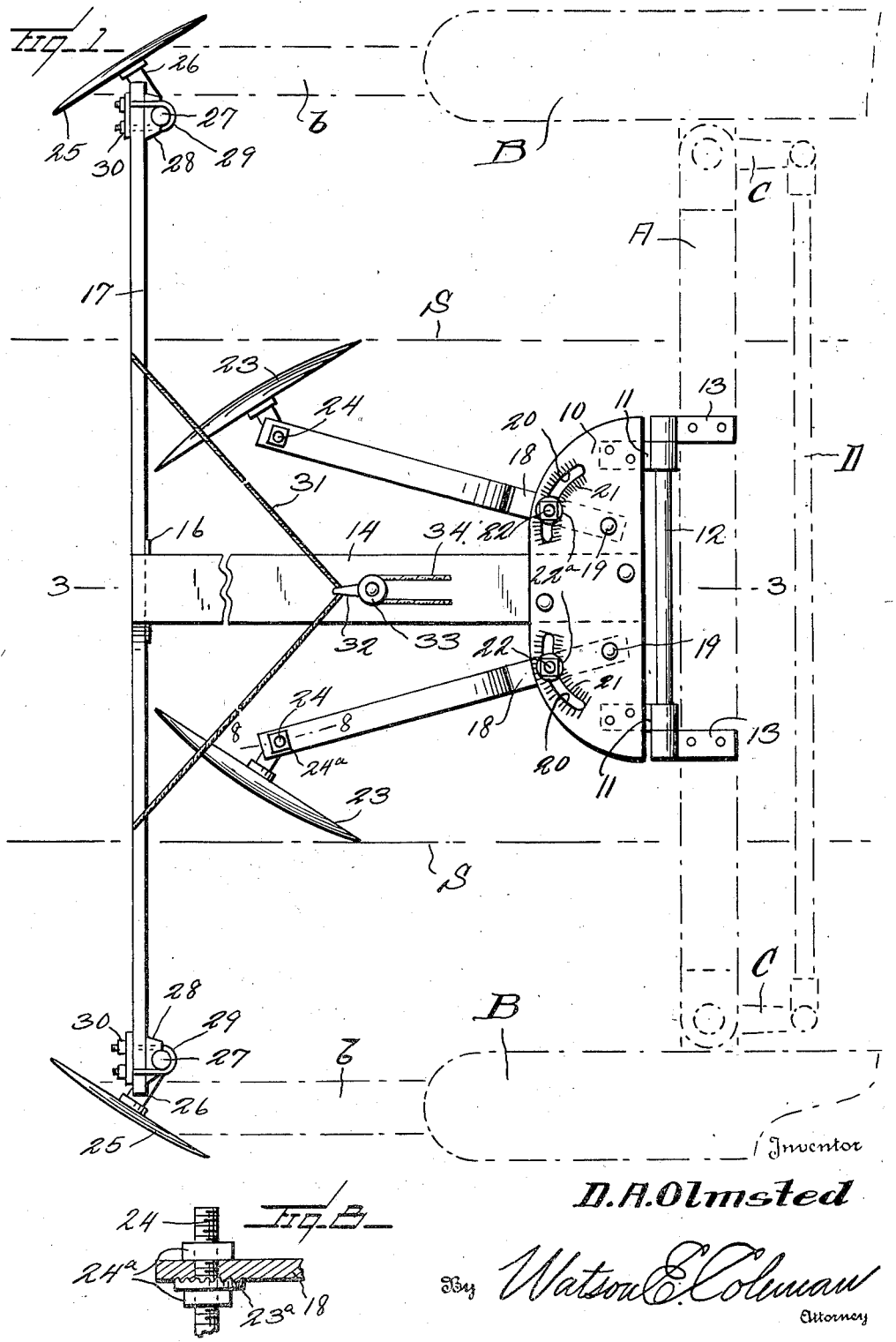
Inventor
D. A. Olmsted
By Watson E. Coleman
Attorney

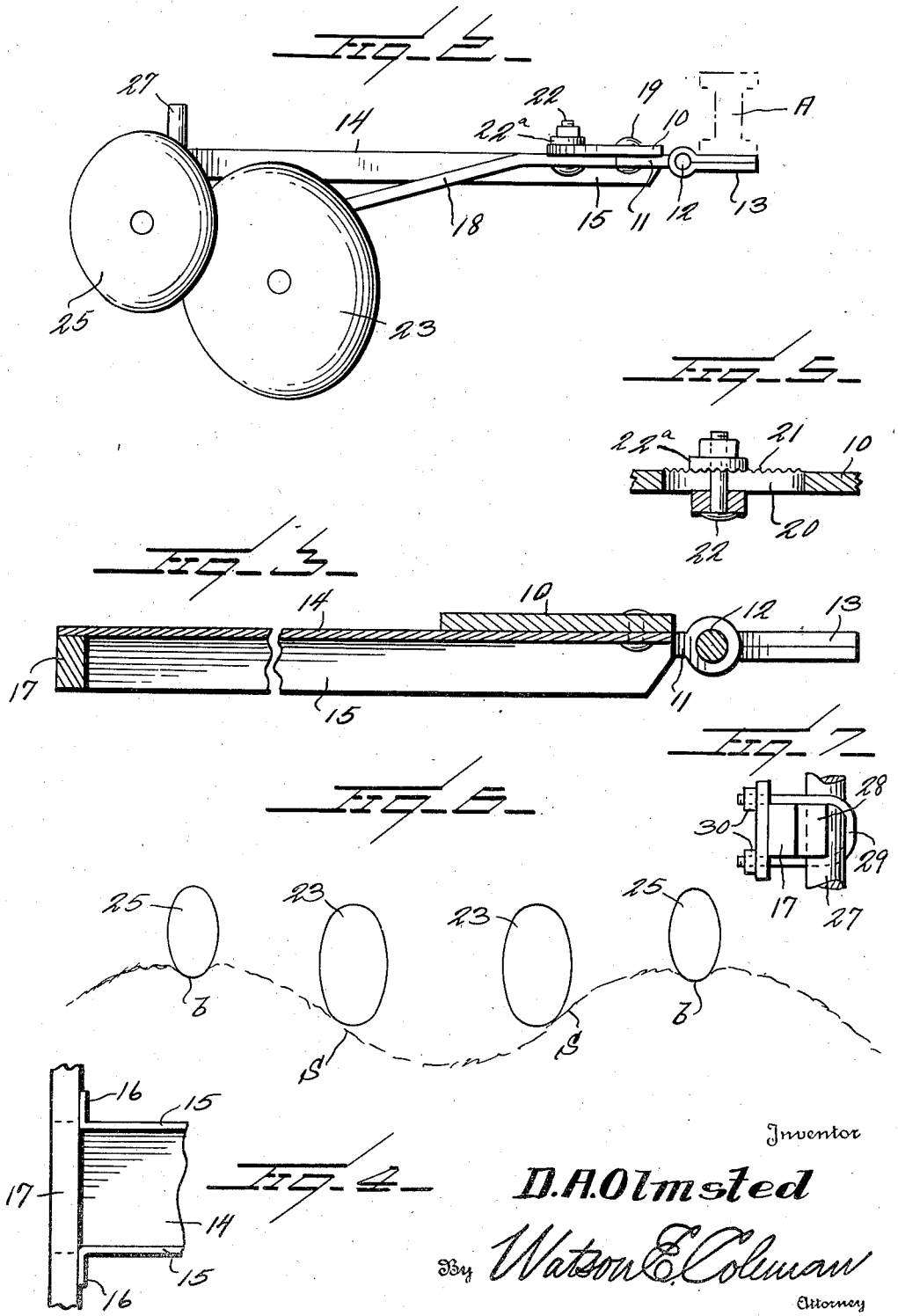

Patented Nov. 2, 1937

2,097,840

UNITED STATES PATENT OFFICE 2,097,840

TRACTOR GUIDE

Donald A. Olmsted, Wauneta, Nebr.

Application December 31, 1936, Serial No. 118,656

8 Claims. (Cl. 97—49)

This invention relates to tractor guides and particularly to a guide for keeping the rubber-tired wheels of a certain type of tractor on the ridges of listed land.

When tractors having rubber-tired wheels are used on listed land, it is difficult to keep the wheels tracking on the crests of the ridges so that the wheels of the tractor will not run off these ridges, and the general object of the invention is to provide means which will act to hold the wheels in place on the crests of the ridges.

Another object is to provide a guide of the character set forth in the form of an attachment which may be readily attached to the front axle of any make of tractor and extend forward therefrom, this guide carrying a pair of elements designed to engage the shoulders of a furrow spanned by the tractor and also carrying a pair of furrow forming elements disposed in advance of the rubber tires of the front wheels, which will each form shallow furrows for the front wheels of the tractor to travel in.

A further object is to provide a mechanism of this character in which the shoulder engaging members are in the form of disks adjustable to any desired angle and the wheel-furrow forming elements are in the form of disks adjustable vertically, adjustable as to angle and adjustable nearer to or further from the longitudinal middle of the attachment.

A still further object is to provide an attachment of this character which may be readily lifted up out of engagement with the ground when desired or lowered into engagement with the ground.

Other objects will appear in the course of the following description.

My invention is illustrated in the accompanying drawings wherein:

Figure 1 is a top plan view of the attachment, the front axle of the tractor and the wheels thereof being shown in dotted lines, there being dotted lines also indicating the shoulders of the furrow and the shallow furrows or tracks formed in advance of the tractor wheels.

Figure 2 is a side elevation of the attachment.

Figure 3 is a longitudinal section on the line 3—3 of Figure 1.

Figure 4 is a fragmentary underside plan view of the main supporting bar of the attachment.

Figure 5 is a detail fragmentary section through the supporting plate and one of the disk carrying arms.

Figure 6 is a diagrammatic view of a furrow and two ridges showing the position of the guiding disks with relation thereto.

Figure 7 is a detail elevation showing the manner in which the furrow forming disks are attached to the vertical spindle.

Figure 8 is a fragmentary section on the line 8—8 of Figure 1.

Referring to these drawings, 10 designates a plate which constitutes the main supporting plate of my attachment and 11 designates hinge straps which extend rearward from the plate, riveted thereto and at their rear ends being formed with eyes for the passage of a pintle 12. This pintle extends into the hinge straps 13 also formed with eyes at their forward ends for the reception of the pintle and are riveted, bolted, clamped or otherwise attached to the front axle A of a tractor. This axle carries wheels, as shown diagrammatically in Figure 1 and designated B, these wheels being rubber-tired. The wheels are shown as being mounted upon knuckles C, the knuckles being connected by a transverse steering rod D.

Attached to the plate 10 by rivets, bolts or otherwise, and extending forward from the middle of this plate is a supporting bar 14 which is U-shaped in cross-section, that is, formed with the depending lateral flanges 15. These lateral flanges 15 at their forward ends are extended beyond the body of the bar and laterally bent, as at 16, and these flanges are welded, riveted, bolted or otherwise attached to a transverse supporting bar 17.

Pivoted to the plate 10 on each side of the bar 14 are the forwardly extending arms 18, these arms being deflected downward and forward, as shown in Figure 2. The pivots for these arms are designated 19. The plate has a pair of curved slots 20 concentric to the pivots 19, the margins of these slots being preferably corrugated or toothed at 21, as shown in Figure 5. Extending through each arm 18 is a bolt 22 and associated with each bolt is a washer 22ª, whose underface is corrugated so as to engage against the teeth 21 and thus hold the arms 18 from any lateral movement after they are adjusted.

The forward end of each arm 18 has pivoted thereto the relatively large disks 23. These disks may have a diameter of approximately 16". The hub of each disk is pivoted by a pivot bolt 24 to the corresponding arm so that the disks may be disposed at any desired angle to the line of draft and obviously the arms 18 may be adjusted outward or inward to space the disks nearer to or further from each other.

Mounted upon the extremities of the transverse bar 17 are a pair of disks 25, these disks being ordinarily about 12" in diameter. Each disk has an arm 26 extending from the hub of the disk and attached to a vertical rod or pintle 27. This rod is vertically adjustable in a seat formed in a bearing 28, this bearing member being held clamped against the bar 17 by means of the U-bolt 29, as shown in detail in Figure 7. The U-bolt embraces the bar 17.

With this construction, it is obvious that the disk 25 may be shifted into any desired angle relative to the line of draft, that it may be raised or lowered relative to the bar 17 and held in its adjusted position by tightening up on the nuts 30 of the U-bolt, and that the U-bolt with the bearing member and the disks may be adjusted longitudinally upon the transverse bar 17 so as to support the disks 25 in any desired spaced relation to each other and so as to bring these disks 25 exactly in line with the front wheels B of the tractor.

For the purpose of raising or lowering the attachment, I have provided a cable 31 attached to the bar 17 at two points, the bight of the cable being engaged by an eye 32 of a pulley 33 to which a cable 34 is engaged, so that by retracting this cable, the attachment may be raised and by releasing the cable, the attachment may be lowered to any desired degree.

In actual practice, the supporting bar 14 will have a length of approximately 5 ft. 4 in., and the bar 17 will project approximately 2 ft. on each side of the bar 14. The arms 18 will, under ordinary circumstances, have a length of approximately 16½ in. These dimensions are merely given to show the general dimensions of the parts with relation to the tractor and obviously are not limitations as to my mechanism.

In the use of the device, the disks 23 are so adjusted that they will engage the shoulders of a ridge, as shown in Figure 6, said shoulders being diagrammatically indicated in Figure 1 by the dotted lines S. This will act to hold the tractor against lateral movement in either direction. The disks 25 are so adjusted as to make a shallow furrow as, for instance, with a depth of approximately 2" and about 4" wide in the crest of the ridge, as indicated by the dotted lines b in Figure 1, in which the tractor wheels B follow. It is obvious that with this construction, the tractor wheels will be caused to travel on the crests of both ridges on each side of a furrow and that thus the tractor may travel over listed land without the wheels slipping off of the crest of the furrow with the tractor spanning the furrow itself.

The disks 23 and the disks 25, of course, are intended to rotate. The exact construction of these disks and the manner of mounting the disks upon their hubs is immaterial. Means should be provided, however, whereby the disks 23 may be held rigidly in any desired angular adjustment relative to the arms 18. I have shown in Figure 8 one means whereby this can be accomplished, in which the hub 23ª is provided with teeth, the underface of the arm 18 is provided with corresponding teeth and the bolt 24 carries nuts 24ª whereby the toothed faces of the arm 18 and the hub may be clamped in engagement with each other. This is purely illustrative of the fact that some means should be provided for rigidly holding the disks 23 in their angularly adjusted positions and obviously I do not wish to be limited to the particular details shown in Figure 8.

It is to be noted that my attachment is designed to be applied to the front axle of the tractor for the reason that the axle is the strongest part of the tractor and by attaching it to the front axle instead of to the front framework of the tractor, the attachment does not interfere with cranking the engine. My attachment provides ample clearance for clamping and also for draining the radiator in cold weather.

While I have illustrated my device in the form of an attachment, it is obvious that it might be applied initially to tractors of this type, and while I have illustrated certain details of construction and arrangement of parts, I do not wish to be limited thereto as obviously many changes might be made in the details of construction without departing from the spirit of the invention as defined in the appended claims.

What is claimed is:—

1. The combination with a tractor having a front axle and rubber-tired wheels thereon, of a guiding element attached to the axle and extending forward therefrom and including means for supporting a pair of guiding members on each side of the middle line of the tractor in position to engage against the confronting shoulders of two ridges, and means carried by said guiding element for supporting a pair of furrow forming members immediately in advance of the tractor front wheels.

2. The combination with a tractor having a front axle and rubber-tired wheels thereon, of a guiding element attached to the axle and extending forward therefrom and including means for supporting a pair of guiding members on each side of the middle line of the tractor in position to engage against the confronting shoulders of two ridges, and means carried by said guiding element for supporting a pair of furrow forming members immediately in advance of the tractor front wheels, the guiding members and the furrow forming members being adjustably mounted for adjustment toward or from the middle line of the guiding element.

3. The combination with a tractor having a front axle and rubber-tired wheels thereon, of a guiding element comprising a forwardly extending bar operatively mounted upon the front axle of the tractor and extending forward therefrom, a transverse bar carried upon the forward end of the longitudinally extending bar, guiding members operatively mounted upon the longitudinal bar and adapted to engage against the coupling shoulders of ridges on each side of a furrow, and furrow forming members carried upon the ends of the transverse bar and adjustable thereon into position immediately in advance of the respective front wheels of the tractor.

4. The combination with a tractor having a front axle and rubber-tired wheels thereon, of a longitudinally extending bar operatively supported upon the front axle and projecting forward into a position forward of said wheels, a transversely extending bar mounted upon the forward end of the longitudinal bar, disks mounted upon the ends of the transverse bar and adjustable along said transverse bar toward or from each other, the disks being vertically adjustable with relation to the transverse bar and being angularly adjustable with relation to the line of draft, a pair of arms operatively supported upon the rear end of the longitudinal bar and extending forward and laterally in opposite directions, the arms being adjustable toward or from each other, and ridge engaging disks mounted upon said arms.

5. The combination with a tractor having a front axle and front wheels, of a longitudinally extending bar operatively supported upon the front end of the tractor, means carried by said bar for supporting a pair of furrow forming disks immediately in advance of the wheels of the tractor, and means operatively carried by said bar for supporting a pair of ridge-shoulder engaging members in advance of the tractor.

6. The combination with a tractor having a front axle and wheels thereon, of a guiding attachment therefor, comprising a longitudinally extending bar, a plate attached to the rear end of the bar and extending transversely thereof, means for operatively connecting said plate to the front axle of the tractor, arms pivoted to the plate one on each side of the longitudinal bar, the plate having arcuate slots, bolts passing through said arms and through said slots to hold the arms in any radially adjusted position, the arms extending downward and forward from said plate, disks mounted upon the forward extremities of the arms for angular adjustment, a transverse bar carried by the forward end of the longitudinal bar and disks mounted upon the transverse bar for angular and vertical adjustment and for adjustment toward or from each other, said last named disks being on a higher level than the first named disks and adapted to form a furrow immediately in advance of the tractor wheels.

7. A guiding attachment for tractors, comprising a longitudinal bar, a plate attached to the bar, a pintle to which the plate is hinged, hinge leaves carried by the pintle and adapted to be engaged with the forward axle of a tractor, a pair of arms pivotally mounted upon the plate for angular adjustment with relation to the longitudinal bar, means for holding said arms set in any angularly adjusted position, the arms extending downward and forward from the plate, a pair of disks mounted upon the forward extremities of the arms for angular adjustment, a transversely extending bar mounted upon the forward end of the longitudinal bar, a pair of disks mounted upon the ends of the transverse bar for angular and vertical adjustment and for adjustment toward or from each other, the disks being disposed on a plane above the plane of the first named disks, and means extending from the transverse bar whereby the attachment may be raised or lowered upon said pintle.

8. A guiding attachment for tractors having rubber-tired front wheels comprising an element adapted to be attached to the forward end of the tractor, and means on said element for supporting a pair of guide disks in advance of the tractor and in position to engage against the confronting shoulders of a furrow spanned by the tractor, and means for supporting a pair of furrow forming disks in advance of the front wheels of the tractor.

DONALD A. OLMSTED.